(12) United States Patent
Yamada et al.

(10) Patent No.: US 8,882,199 B2
(45) Date of Patent: Nov. 11, 2014

(54) SEAT RECLINING APPARATUS FOR VEHICLE

(75) Inventors: Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 296 days.

(21) Appl. No.: 13/461,145

(22) Filed: May 1, 2012

(65) Prior Publication Data

US 2012/0292970 A1   Nov. 22, 2012

(30) Foreign Application Priority Data

May 17, 2011   (JP) .................................. 2011-110703

(51) Int. Cl.
*B60N 2/235*   (2006.01)

(52) U.S. Cl.
CPC ........... *B60N 2/2356* (2013.01); *B60N 2205/50* (2013.01)
USPC .................................... 297/367 P; 297/367 R

(58) Field of Classification Search
USPC ............ 297/354.1, 366, 376 R, 367 L, 367 P, 297/368, 369
See application file for complete search history.

(56) References Cited

U.S. PATENT DOCUMENTS

| 7,441,840 B2 | 10/2008 | Yamada et al. | |
| 7,648,204 B2 * | 1/2010 | Oki | 297/367 L |
| 7,992,938 B2 | 8/2011 | Kojima et al. | |
| 8,002,352 B2 | 8/2011 | Yamada et al. | |
| 2009/0140565 A1 * | 6/2009 | Wahls et al. | 297/369 |
| 2010/0141006 A1 * | 6/2010 | Nadgouda et al. | 297/367 P |
| 2010/0269615 A1 * | 10/2010 | Endou et al. | 74/409 |
| 2011/0018325 A1 * | 1/2011 | Yamada et al. | 297/367 R |
| 2012/0292970 A1 * | 11/2012 | Yamada et al. | 297/354.1 |
| 2013/0161994 A1 * | 6/2013 | Ito | 297/367 P |
| 2014/0077562 A1 * | 3/2014 | Higashi et al. | 297/367 R |

FOREIGN PATENT DOCUMENTS

| JP | 2009-207600 | 9/2009 |
| JP | 2010-22401 | 2/2010 |

OTHER PUBLICATIONS

Extended European Search Report issued Aug. 31, 2012 in European Patent Application No. 12168272.8.

* cited by examiner

*Primary Examiner* — David R Dunn
*Assistant Examiner* — Timothy J Brindley
(74) *Attorney, Agent, or Firm* — Oblon, Spivak, McClelland, Maier & Neustadt, L.L.P.

(57) ABSTRACT

A seat reclining apparatus for a vehicle includes a first arm including a guide wall, a second arm including internal teeth and being rotatably supported by the first arm, a pawl including external teeth which are engageable with and disengageable from the internal teeth, a cam engaging with the pawl for causing the pawl to advance and retract along a guide wall and for causing the internal teeth and the external teeth to mesh with and unmesh from each other as the cam rotates, a recessed portion recessed in a direction of an axis line of the second arm and including a restricting portion, an engaging portion restricting the external teeth and the internal teeth from meshing with each other by being in contact with the restricting portion, a hinge cam including a first shaft portion, a second shaft portion and a flange portion, and a biasing member.

2 Claims, 4 Drawing Sheets

SEAT RECLINING APPARATUS FOR VEHICLE

CROSS REFERENCE TO RELATED APPLICATIONS

This application is based on and claims priority under 35 U.S.C. §119 to Japanese Patent Application 2011-110703, filed on May 17, 2011, the entire content of which is incorporated herein by reference.

TECHNICAL FIELD

This disclosure generally relates to a seat reclining apparatus for a vehicle.

BACKGROUND DISCUSSION

A known seat reclining apparatus for a vehicle is disclosed in JP2009-207600A (hereinafter referred to as Patent reference 1). The seat reclining apparatus disclosed in the Patent reference 1 is provided with a ratchet including a cylindrical portion formed with an internal tooth portion and a protruding face, a guide journaled at the ratchet, pawls each of which movement in a radial direction is guided by guiding walls provided at the guide, a cam engaging with the pawls, and a hinge cam connected to the cam so as to integrally rotate with the cam. A rotation of the cam causes the pawls guided by the guide (the guide walls) to advance and retract in the radial direction, thereby bringing the internal tooth portion of the ratchet and external tooth of each pawl into engagement with each other and releasing the engagement thereof. Thus, a rotation of the ratchet relative to the guide is restricted and allowed. Accordingly, a rotation of a seatback relative to a seat cushion is restricted and allowed (locked and unlocked), and the seatback may be adjusted and retained at a desired inclination angle suitable for, for example, an occupant to be seated. In addition, in a case where the pawls guided by the guide (the guide walls) are advanced in the radial direction by the rotation of the cam, the external teeth of the pawl are in contact with the protruding face of the ratchet. Thus, the rotation of the ratchet relative to the guide is unrestrictable. In other words, the pawls are arranged at three positions leaving intervals of ninety degrees thereamong, and thus an area at which no tooth is formed (the protruding face) is provided at the cylindrical portion of the ratchet, next to the internal tooth portion. Accordingly, the seat reclining apparatus disclosed in the Patent reference 1 is configured so that locking is not established in a case where the ratchet rotates and a specified pawl, from among the pawls, corresponds to or matches the area at which no tooth is formed. This is for avoiding unnecessary locking in a state where the seatback leans forward.

The cam is biased by a biasing spring for locking, which is mounted on the hinge cam for a purpose of locking so as to rotate in a direction in which the pawls are advanced in the radial direction, that is, in a direction in which the external teeth of the pawls mesh with the internal tooth portion of the ratchet or in which the external teeth of the pawl are in contact with the protruding face. The hinge cam is integrally rotatably connected to an operation shaft to which a releasing operation force is to be inputted. Accordingly, the cam is biased by the biasing spring via the hinge cam to rotate, and thus, the external teeth of the pawls are brought to, for example, mesh with the internal tooth portion of the ratchet. On the other hand, as the releasing operation force is inputted to the operation shaft, the cam rotates in an opposite direction against a biasing force of the biasing spring, and thus the cam causes, for example, the external teeth of the pawls disengage from the internal tooth portion of the ratchet.

According to the Patent reference 1, when the releasing operation is performed on the operation shaft in a state where the seatback is leaned back, that is for example, when the seatback is leaned or moved forward by the biasing force of the spring in order to stand the seatback, there is a possibility that the external teeth of the pawl collide with the area at which no tooth is formed (the protruding face), which may cause deformation of a tooth tip.

On the other hand, a known seat reclining apparatus for a vehicle is disclosed in JP2010-22401A (hereinafter referred to as Patent reference 2). According to the known seat reclining apparatus disclosed in the Patent reference 2, avoidance of the aforementioned collision of the external teeth of the pawls is suggested while an engagement structure of the pawl and the cam is different from that disclosed in the Patent reference 1. In other words, an upper arm formed with internal teeth includes a circular recessed portion arranged so as to be concentric with the internal teeth and is formed with a protruding portion provided at the circular recessed portion so as to protrude inwardly in a radial direction. A pawl formed with external teeth meshable with the internal teeth includes a step-like engaging portion provided to face an inner circumferential surface of the circular recessed portion in the radial direction. In other words, the external teeth and the engaging portion of the pawl are arranged at different positions from each other in an axial direction. As the upper arm rotates, in a case where the engaging portion of the pawl faces and is in contact with the protruding portion of the circular recessed portion in the radial direction, the external teeth of the pawl do not mesh with the internal teeth of the upper arm, and thus locking is not established. In a case where the engaging portion of the pawl is out of contact from the protruding portion of the circular recessed portion in the radial direction, the external teeth of the pawl are meshable with the internal teeth of the upper arm. Thus, the aforementioned collision of the external teeth of the pawl, which occurs for example when the seatback leans forward, may be avoided.

In a case where the structure (the circular recessed portion and the engaging portion) of the Patent reference 2 is applied to the Patent reference 1 in order to avoid the collision of the external teeth of the pawl, a clearance that corresponds to the circular recessed portion is generated in a space in which, for example, the pawls and the cam are accommodated. Thus, retention of postures of the pawls, the cam and the hinge cam may possibly be unstable in the axial direction. This is because engagement structures of the pawls and the cam (a hook and an engagement portion), in which the pawls are advanced and retracted in the radial direction as the cam rotates, are established in an identical range in the axial direction, and the engaging portion configured to face the protruding portion formed at the circular recessed portion is arranged in the circular recessed portion.

In order to fill the clearance generated in the space in which, for example, the pawls and the cam are accommodated, it may be considered that the hinge cam is extended in the axial direction corresponding to the circular recessed portion, and that a flange protruding outwardly for restricting the pawls and the cam in the axial direction is arranged at the extended portion of the hinge cam. However, in a case where the aforementioned flange is provided at the hinge cam which is supported by a guide at one side of the hinge cam (that is, a cantilever-type hinge cam) and which is biased by a biasing spring at a protruding portion protruding from the guide outwardly in the axial direction, an axis line of the hinge cam may be inclined by a biasing force of the biasing spring. In such a case, the flange may be inclined associated with the inclination of the axis line, and thus the flange may interfere with the pawl and the cam, or with the circular recessed portion of the ratchet. Accordingly, operations related to locking and unlocking (specifically, the locking operation) may not be performed smoothly.

A need thus exists for a seat reclining apparatus for a vehicle which is not susceptible to the drawback mentioned above.

SUMMARY

According to an aspect of this disclosure, a seat reclining apparatus for a vehicle includes a first arm configured to be fixedly attached to one of a seat cushion and a seatback and including a guide wall, a second arm configured to be fixedly attached to the other one of the seat cushion and the seatback, including internal teeth and being rotatably supported by the first arm, a pawl arranged in an accommodating space formed between the first arm and the second arm, including external teeth which are engageable with and disengageable from the internal teeth and being arranged in a manner that movement of the pawl in a radial direction of the first arm is guided by the guide wall, a cam rotatably arranged in the accommodating space at a radially inner side relative to the pawl, engaging with the pawl, causing the pawl to advance and retract along the guide wall, and causing the internal teeth and the external teeth to mesh with and unmesh from each other as the cam rotates, a recessed portion provided at the second arm concentrically with the internal teeth in a manner that the recessed portion is recessed in a direction of an axis line of the second arm and including a restricting portion provided in a range of a predetermined angle and protruding inwardly in a radial direction of the second arm, an engaging portion formed at the pawl in a manner that the engaging portion faces the recessed portion in a radial direction of the pawl at a position different, in the direction of the axis line, from an engagement position at which the pawl and the cam engage with each other, and restricting the external teeth and the internal teeth from meshing with each other by being in contact with the restricting portion, a hinge cam integrally rotatably fitted in the cam by insertion in the direction of the axis line and including a first shaft portion, a second shaft portion and a flange portion, the first shaft portion penetrates through the first arm and is rotatably supported at the first arm, the second shaft portion penetrates through the second arm and is journaled at the second arm, the flange portion is accommodated in a space defined by the recessed portion at a radially inner side relative to the engaging portion, and a biasing member biasing and rotating the hinge cam at the first shaft portion in one direction and causing via the cam the pawl to move in a radial direction in which the external teeth and the internal teeth mesh with each other or in which the engaging portion and the restricting portion are in contact with each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
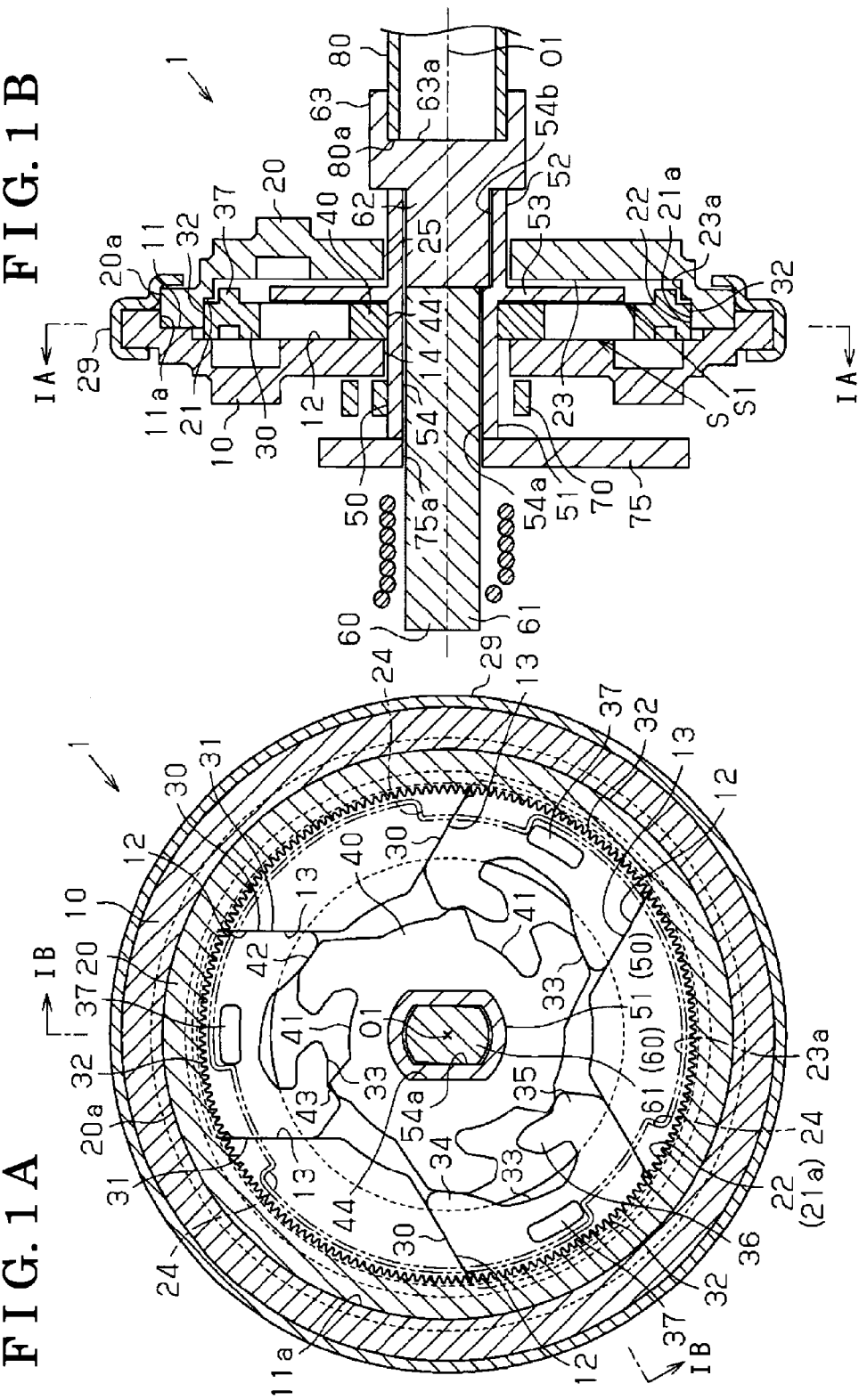
FIG. 1A is a cross-sectional view illustrating an embodiment disclosed here and taken along line IA-IA in FIG. 1B.
FIG. 1B is a longitudinal cross-sectional view illustrating the embodiment and taken along line IB-IB in FIG. 1A.

An embodiment of a seat reclining apparatus for a vehicle related to this disclosure will be described with reference to FIGS. 1A to 4B. As illustrated in FIGS. 1A and 1B, a recliner 1 includes a lower arm 10 (i.e., a first arm) formed into a disc shape and an upper arm 20 (i.e., a second arm) formed into a disc shape. The lower arm 10 is fixed to a seat cushion constituting a seating portion of a seat for the vehicle. The upper arm 20 is fixed to a seatback constituting a back rest of the seat for the vehicle.

The lower arm 10 is formed by, for example, performing a half blanking process on a metal plate and includes a first recessed portion 11 formed into a circular shape and opening toward the upper arm 20. The first recessed portion 11 includes a first inner circumferential surface 11a centered with respect to a rotation axis O1 (i.e., an axis line), which is the rotation axis of the lower arm 10 and of the upper arm 20. In the first recessed portion 11 of the lower arm 10, a guide groove 12 having a substantially U-shaped groove configuration and extending in a radial direction of the lower arm 10 whose center is the rotation axis O1 is provided at, for example, three positions. The three guide grooves 12 are arranged so as to leave an equal angle between adjacent guide grooves 12 on a circumference of the first recessed portion 11. The guide grooves 12 are in communication with one another at a central portion of the lower arm 10 and arranged in a substantially Y-shape as a whole. Each guide groove 12 includes inner walls which are positioned at side portions in the circumferential direction and which define guide walls 13, 13 that are parallel to each other. At the central portion of the lower arm 10, where the three guide grooves 12 are in communication with one another, a through hole 14 having a circular shape is provided.

The upper arm 20 is formed by, for example, performing a half blanking process on a metal plate and includes an outer circumferential surface 20a whose outer diameter is equal to an inner diameter of the first inner circumferential surface 11a of the lower arm 10. The upper arm 20 also includes a second recessed portion 21 formed into a circular shape and opening toward the lower arm 10. The second recessed portion 21 includes a second inner circumferential surface 21a centered with respect to the rotation axis O1. The second inner circumferential surface 21a of the second recessed portion 21 is provided with internal teeth 22 formed along an entire circumference of the second inner circumferential surface 21a. A recessed portion 23 having a circular shape is formed at a radially inner side relative to the second recessed portion 21 so as to be concentrically with the second recessed portion 21. As illustrated in FIG. 1A, a protruding portion 24 (i.e., a restricting portion) having a substantially arc-shape and protruding toward the rotation axis O1 is formed at, for example, three positions at an inner circumferential surface 23a of the recessed portion 23. The protruding portion 24 is formed in a range of a predetermined angle in a circumferential direction of the upper arm 20 and protrudes inwardly in a radial direction of the upper arm 20. The three protruding portions 24 are arranged so as to leave an equal angle between adjacent protruding portions 24 on a circumference of the recessed portion 23. The upper arm 20 also includes a through hole 25 having a circular shape and formed at a central portion of the recessed portion 23 of the upper arm 20. An inner diameter of the through hole 25 is equal to an inner diameter of the through hole 14.

As illustrated in FIG. 1B, the upper arm 20 fits in the lower arm 10 in a manner that the outer circumferential surface 20a slidably contacts with the first inner circumferential surface 11a of the lower arm 10. In a state where the first inner circumferential surface 11a of the lower arm 10 and the outer circumferential surface 20a of the upper arm 20 fit with each other, a holder 29 made of a metal plate and having a ring shape is attached to outer circumferential portions of the lower arm 10 and of the upper arm 20. The holder 29 restricts the lower arm 10 and the upper arm 20 from coming off from each other in an axial direction, that is, a direction of the rotation axis O1, while allowing a relative rotation between the lower arm 10 and the upper arm 20.

The lower arm 10 and the upper arm 20 define an accommodating space S therebetween, and the accommodating space S accommodates a pawl 30, for example, three pawls 30 and a cam 40. The three pawls 30 are arranged in a plane perpendicular to the rotation axis O1 so as to leave an equal angle between adjacent pawls 30 on a circumference of the plane.

Each pawl 30 is made by, for example, pressing or stamping a steel plate, and is formed in a flat plate shape having a substantially gate-like configuration and basically includes no steps. Width-direction end portions 31 of each pawl 30 are formed to have straight lines parallel to each other. Each pawl 30 is provided to be movable along the guide groove 12 in the radial direction in a manner that the width-direction end portions 31 slide along the guide walls 13 of the guide groove 12.

External teeth 32 are formed at an outward end of each pawl 30, that is, the outward end having an arc shape (the end surface facing the internal teeth 22 of the upper arm 20). The external teeth 32 are meshable, that is, engageable with the internal teeth 22 of the upper arm 20. Thus, as illustrated in FIG. 1B, each pawl 30 is arranged in a range in the axial direction, the range in which the guide grooves 12 of the lower arm 10 and the second recessed portion 21 (the internal teeth 22) of the upper arm 20 are formed.

An inner surface cam portion 33, which engages with an outer circumferential portion of the cam 40, is formed at an inward end (the end surface facing the opposite direction to the outward end) of each pawl 30. In FIG. 1A, each inner surface cam portion 33 is defined by a pair of pressed portions 34, 35 and an engagement portion 36. The pressed portion 34 is positioned at a forward side of the pawl 30 in the clockwise rotational direction and the pressed portion 35 is positioned at a forward side of the pawl 30 in the counter clockwise rotational direction. The engagement portion 36 is positioned inside the substantially gate-like configuration configured by the pressed portions 34, 35. Each pawl 30 is formed with an engaging portion 37 having an arc-shape and protruding in the axial direction toward the upper arm 20 so as to face the recessed portion 23 (the inner circumferential surface 23a) in the radial direction. The engaging portion 37 faces the recessed portion 23 in the radial direction at a position different, in the axial direction, from an engagement position at which the pawl 30 and the cam 40 engage with each other.

The cam 40 is made by, for example, pressing or stamping a steel plate, and is formed in a flat plate shape having no steps. The cam 40 is arranged in the range in the axial direction, the range in which the guide grooves 12 of the lower arm 10 and the second recessed portion 21 (the internal teeth 22) of the upper arm 20 are formed, so as to be rotatable about the rotation axis O1. That is, the cam 40 is arranged in the range in the axial direction, the range in which the pawls 30 are arranged.

The cam 40 includes a cam surface 41, for example, three cam surfaces 41 provided at the outer circumferential portion of the cam 40, leaving an equal angle between adjacent cam surfaces 41 on a circumference of the cam 40. In FIG. 1A, each cam surface 41 is defined by a hook 42 positioned at a forward side of the cam 40 in the clockwise rotational direction, and a shoulder portion 43 formed into a substantially rectangular shape and positioned at a forward side of the cam 40 in the counter clockwise rotational direction. As the cam 40 rotates in the clockwise rotational direction in FIG. 1A, each of the hooks 42 and the shoulder portions 43 presses the corresponding pressed portions 34, 35 of the pawl 30, thereby pushing each pawl 30 along the guide grooves 12 of the lower arm 10 outwardly in the radial direction. At this time, in a case where none of the engaging portions 37 of the pawls 30 faces any of the protruding portions 24 of the upper arm 20 in the radial direction, the external teeth 32 of each pawl 30 mesh with the internal teeth 22 of the upper arm 20. On the other hand, in a case where the engaging portion 37 of any of the pawls 30 faces any of the protruding portions 24 of the upper arm 20 in the radial direction, the pawls 30 are blocked from moving outwardly in the radial direction and the cam 40 is blocked from rotating, and thus the external teeth 32 of the pawls 30 are not meshable with the internal teeth 22 of the upper arm 20, that is, the external teeth 32 and the internal teeth 22 are restricted from meshing with each other.

As the cam 40 rotates in the counter clockwise rotational direction in FIG. 1A, each hook 42 engages with the engagement portion 36 of the corresponding pawl 30, and thus the cam 40 pulls the pawls 30 along the guide grooves 12 of the lower arm 10 inwardly in the radial direction. Accordingly, a state in which the external teeth 32 of each pawl 30 and the internal teeth 22 of the upper arm 20 are meshed with each other is released. At a central portion of the cam 40, a cam fitting hole 44 having a substantially elliptic shape is formed.

A hinge cam 50 is fitted in the cam fitting hole 44 of the cam 40 by insertion. Thus, the hinge cam 50 includes an axis line extending along the rotation axis O1. The hinge cam 50 includes a first shaft portion 51 penetrating through the lower arm 10 (the through hole 14) and rotatably supported at the lower arm 10, a second shaft portion 52 penetrating through the upper arm 20 (the through hole 25) and journaled at the upper arm 20, and a flange portion 53 accommodated in a space S1 defined by the recessed portion 23 at a radially inner side relative to the engaging portion 37. The first shaft portion 51 includes an outer wall surface formed into a substantially elliptic-shape as viewed in cross section. The hinge cam 50 fits in the cam fitting hole 44 of the cam 40 at the first shaft portion 51. Thus, the cam 40 is connected to the hinge cam 50 so as to rotate integrally therewith. On the other hand, the second shaft portion 52 includes an outer circumferential surface whose outer diameter is equal to an inner diameter of the through hole 25, and is in slidably contact with the through hole 25. The flange portion 53 is accommodated in the space S1 defined by the recessed portion 23 at the radially inner side relative to the engaging portion 37, thereby restricting all the pawls 30 and the cam 40 between the guide grooves 12 of the lower arm 10 and the flange portion 53 in the axial direction. The hinge cam 50 includes an insertion hole 54 penetrating through a central portion of the hinge cam 50 along the direction of the rotation axis O1. The insertion hole 54 defines a hinge fitting hole 54a having a substantially elliptic shape and formed in a range of the first shaft portion 51 and the flange portion 53 in the axial direction thereof, and defines a supporting hole 54b having a circular shape and formed in a range of the second shaft portion 52 in the axial direction thereof.

A hinge pin 60 having a rod shape is fitted in the insertion hole 54 of the hinge cam 50 by insertion. Thus, the hinge pin 60 includes an axis line extending along the rotation axis O1. The hinge pin 60 includes a fitting portion 61 having a columnar shape and a substantially elliptic-shaped cross section and fitted in the hinge fitting hole 54a, and a cylindrical portion 62 fitted in the supporting hole 54b by insertion. An outer shape of the fitting portion 61 is defined by cutting out portions of the cylindrical portion 62, the portions positioned in angular ranges facing with each other in a radial direction of the cylindrical portion 62, along the rotation axis O1 so that each of the cut-out portions includes a planar surface. Thus, the fitting portion 61 is configured so that a cross-sectional shape of the fitting portion 61 fits within a cross-sectional shape of the cylindrical portion 62.

The hinge pin 60 includes a socket portion 63 which has a closed-end cylindrical shape and a larger diameter than a diameter of the cylindrical portion 62. A first end surface 63a, which defines a bottom surface of the socket portion 63, extends in a plane that is perpendicular to the axial direction.

Figure 2:
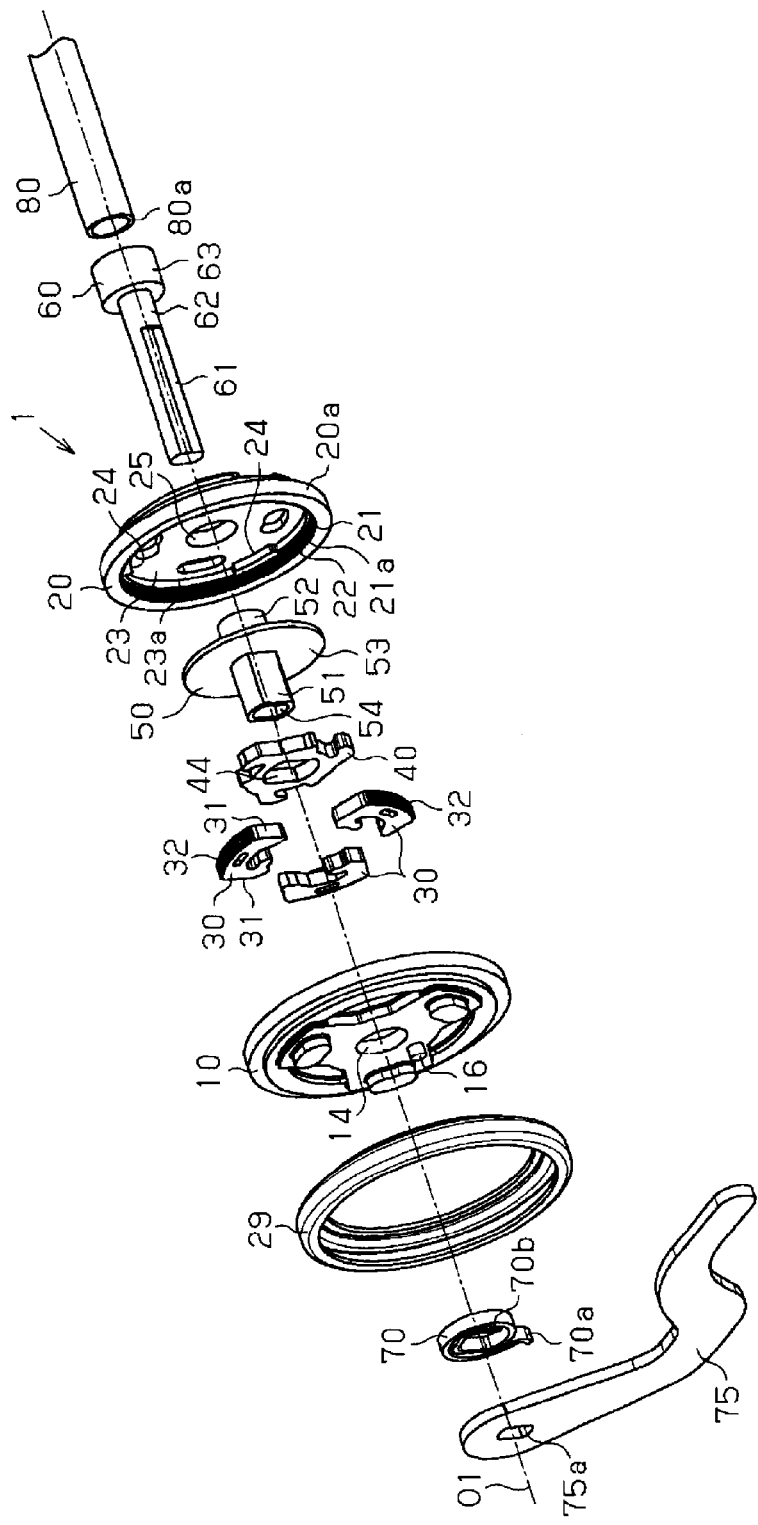
FIG. 2 is an exploded perspective view illustrating the embodiment.

As illustrated in FIG. 2, a biasing member 70 is constituted by a spiral spring having a leg portion 70a and a leg portion 70b. The leg portion 70a is positioned at a radially outer side of the biasing member 70 and is engaged at an engagement protruding portion 16 of the lower arm 10. The leg portion 70b is positioned at a radially inner side of the biasing member 70 and is engaged at the first shaft portion 51 of the hinge cam 50. The biasing member 70 biases the hinge cam 50 to rotate in one direction, thereby causing, via the cam 40, the pawls 30 to move in a radial direction in which the external teeth 32 and the internal teeth 22 mesh with each other or the engaging portion 37 and the protruding portion 24 come in contact with each other.

An operation member 75 made of a plate material and is formed into a substantially bow shape is fitted around an end portion of the hinge pin 60 (the fitting portion 61) which extends beyond the lower arm 10. Specifically, the operation member 75 includes a fitting hole 75a formed into a substantially elliptic-shape and penetrating an end portion of the operation member 75 along the rotation axis O1. The fitting portion 61 fits in the fitting hole 75a in a manner that the operation member 75 is in contact with an end surface of the hinge cam 50 (the first shaft portion 51), and thus the operation member 75 is integrally rotatably connected to the hinge pin 60. In a case where a releasing operation force is inputted from the operation member 75, the hinge cam 50 is rotated in an opposite direction, that is, the direction opposite to a biasing direction of the biasing member 70, against a biasing force of the biasing member 70. At this time, the hinge cam 50 causes, via the cam 40, the pawls 30 to move in a radial direction in which the external teeth 32 and the internal teeth 22 unmesh, that is, disengage from each other. Thus, the operation member 75 inputs the releasing operation force to the hinge pin 60.

Figure 3:
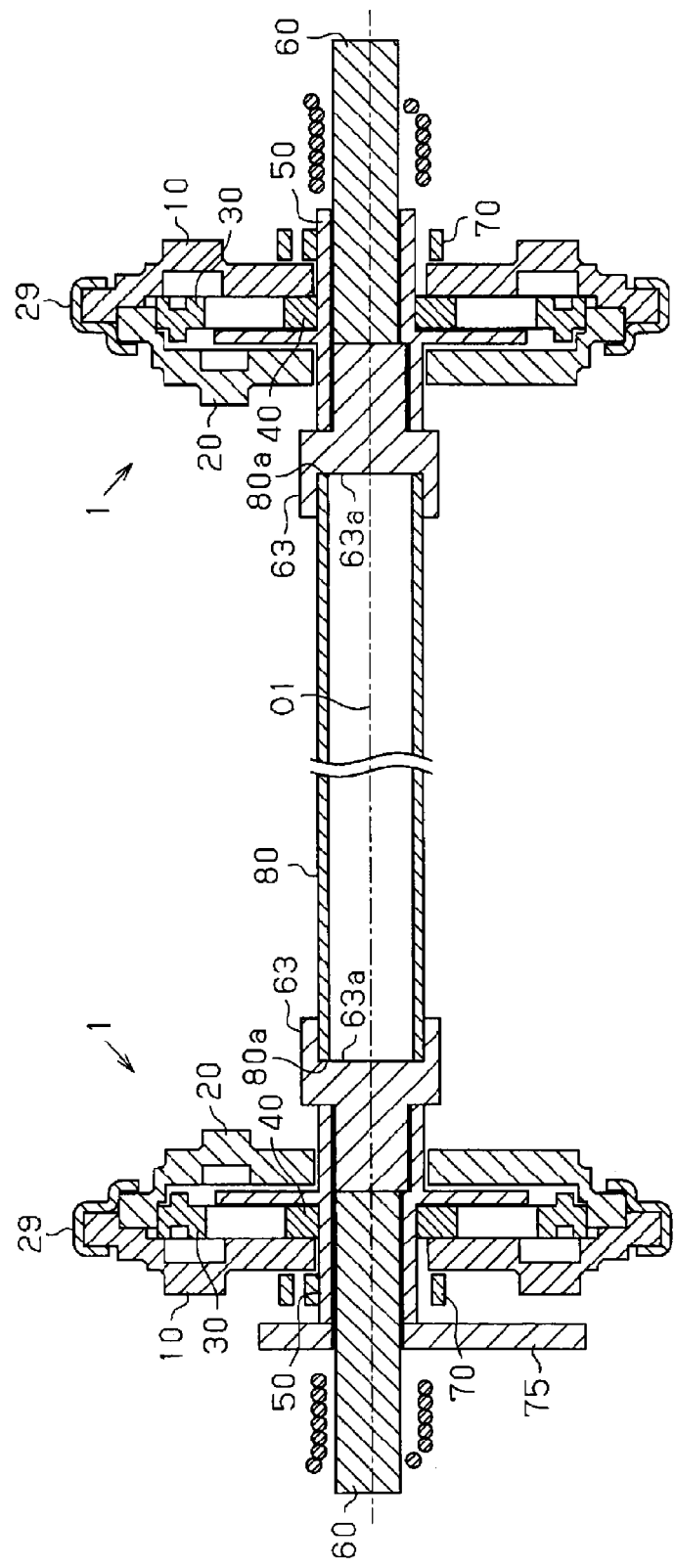
FIG. 3 is a longitudinal cross-sectional view illustrating the embodiment.

As illustrated in FIG. 3, the recliner 1 is arranged at both sides in a seat width direction as a pair, that is, the recliner 1 is arranged at each side in the seat width direction. The pair of recliners 1, 1 includes an identical structure except that the operation member 75 is provided at one recliner 1 (the recliner 1 positioned on the left in FIG. 3), so that the recliners 1, 1 include left-right symmetrical structures. The hinge pin 60 of each recliner 1 is integrally rotatably connected to a connecting member 80 at the socket portion 63 facing the connecting member 80 in the seat width direction (the axial direction). The connecting member 80 has a cylindrical shape and an axis line thereof extends in the seat width direction. Specifically, an outer diameter of the connecting member 80 is equal to an inner diameter of each socket portion 63. Each of second end surfaces 80a of the connecting member 80 in the seat width direction is formed into a ring shape and extends in a plane perpendicular to the axial direction. The connecting member 80, whose end portions are fitted in the socket portions 63 by insertion, is sandwiched between the hinge pins 60 in an axially compressed state and is fixedly attached to the corresponding hinge pin 60 by means of, for example, welding. At this time, the connecting member 80 is fixedly attached to the hinge pins 60 in a state where each first end surface 63a and corresponding second end surface 80a are pressed against each other in the axial direction in order to improve coaxiality (straightness) of the hinge pins 60 and the connecting member 80 as a whole. As the releasing operation force is inputted from the operation member 75, a rotation of one of the hinge pins 60 is transmitted via the connecting member 80 to the other hinge pin 60 positioned opposite in the seat width direction.

Figure 4A:
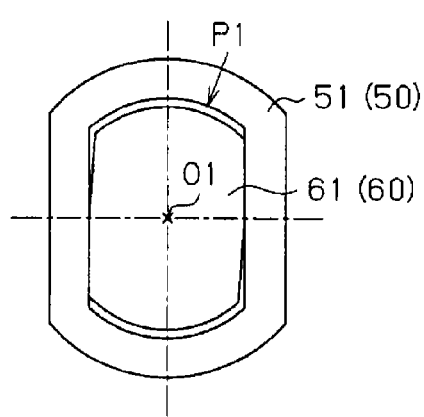
FIG. 4A is a cross-sectional view illustrating a manner in which a hinge cam and a hinge pin are fitted with each other according to the embodiment.
Figure 4B:
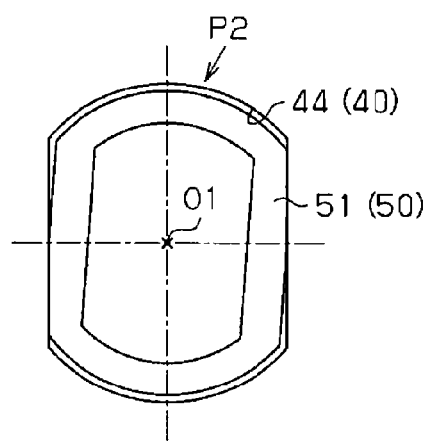
FIG. 4B is a cross-sectional view illustrating a manner in which a cam and the hinge cam are fitted with each other according to the embodiment.

As illustrated in FIG. 4A, a play P1 is set between the hinge fitting hole 54a of each hinge cam 50 and the fitting portion 61 of each hinge pin 60 in a circumferential direction and in a radial direction of the hinge cam 50 in a manner that the play P1 is centered with respect to the rotation axis O1 (the axial direction). In a manner similar to the above, as illustrated in FIG. 4B, a play P2 is set between the cam fitting hole 44 of each cam 40 and the first shaft portion 51 of each hinge cam 50 in the circumferential direction and in the radial direction in a manner that the play P2 is centered with respect to the rotation axis O1 (the axial direction). Accordingly, even in a case where variation of rotation angle is generated, by an assembly error, between the hinge cams 50, 50 each of which is positioned at each side in the seat width direction or between the hinge pins 60, 60 which of which is positioned at each side in the seat width direction, the variation is absorbed in a range of the play P1 and the play P2, and thus variation of rotation angle between the cams 40, 40 each of which is positioned at each side in the seat width direction is restricted.

Next, an operation of the embodiment will be described. As shown in FIG. 1A, when each recliner 1 is in a locked state, the cam 40 is biased by the biasing member 70 to rotate in the clockwise rotational direction in FIG. 1A, and thus each of the hooks 42 and the shoulder portions 43 of the cam 40 presses the corresponding pressed portions 34, 35 of each pawl 30. At this time, the external teeth 32 of each pawl 30, which is pushed along the guide grooves 12 outwardly in the radial direction, and the internal teeth 22 of the upper arm 20 mesh with each other, and thus a rotation of the upper arm 20 relative to the lower arm 10 is restricted.

In the above-described state, when the releasing operation force is inputted from the operation member 75 and the cam 40 is rotated in the counter clockwise rotational direction in FIG. 1A against the biasing force of the biasing member 70, each hook 42 of the cam 40 engages with the corresponding engagement portion 36 of each pawl 30. At this time, the meshing between the external teeth 32 of each pawl 30, which is pulled along the guide grooves 12 inwardly in the radial direction, and the internal teeth 22 of the upper arm 20 is released. Thus, the seatback is allowed to rotate to an arbitrary angular position relative to the seat cushion.

When each recliner 1 is in an unlocked state and the seatback is rotated relative to the seat cushion in a forward direction beyond a predetermined angle, that is, when the seatback is rotated to be in a so-called range of forward leaning angle (that is, a forward leaning state), the protruding portion 24 formed at the inner circumferential surface 23a of the recessed portion 23 of the upper arm 20 faces, in the radial direction, the engaging portion 37 formed at each pawl 30. Accordingly, each pawl 30 is restricted from moving outwardly in the radial direction thereof because the engaging portion 37 of the pawl 30 engages with the protruding portion 24 of the upper arm 20. In the above-described state, when the releasing operation force at the operation member 75 is removed, the cam 40 is biased by the biasing member 70 to rotate in the clockwise rotational direction in FIG. 1A, each of the hooks 42 and the shoulder portions 43 of the cam 40 presses the corresponding pressed portions 34, 35 of each pawl 30. However, each pawl 30 is restricted from moving because the protruding portion 24 of the upper arm 20 engages with the engaging portion 37 of the pawl 30, and the meshing is not established. Consequently, in the range of forward leaning angle, the seatback is not locked and is rotatable freely.

When the seatback, which is in the forward leaning state, is returned backward by inputting the releasing operation force to the operation member 75 so as to be in a position most suitable for the occupant to be seated, and the releasing operation force inputted to the operation member 75 is removed while the seatback remains at the position most suitable for the occupant to be seated, the pawls 30 and the cam 40 return to a state shown in FIG. 1A, and thus the locked state is established.

Specifically, because the flange portion 53 of the hinge cam 50 is accommodated in the space S1 defined by the recessed portion 23 at the radially inner side relative to the engaging portion 37, all the pawls 30 and the cam 40 are restricted in the axial direction. Thus, postures of the pawls 30 and the cam 40 are stably retained in the axial direction. In addition, because the hinge cam 50 is supported by the lower arm 10 at the first shaft portion 51 and is supported by the upper arm 20 at the second shaft portion 52, that is, the hinge cam 50 is supported at both ends thereof, inclination of the axis line of the hinge cam 50, the inclination which may be caused by the rotation of the hinge cam 50 as the hinge cam 50 is biased by the biasing member 70 at the first shaft portion 51, is restricted.

As described above, according to the aforementioned embodiment, following effects and advantages are obtained.

(1) According to the embodiment, the flange portion 53 of the hinge cam 50 is accommodated in the space S1 defined by the recessed portion 23 at the radially inner side relative to the engaging portion 37, thereby restricting all the pawls 30 and the cam 40 in the axial direction. Thus, the postures of the pawls 30 and the cam 40 are stably maintained in the axial direction. In addition, the hinge cam 50 is supported by the lower arm 10 at the first shaft portion 51 and is supported by the upper arm 20 at the second shaft portion 52, that is, the hinge cam 50 is supported at both ends thereof. Accordingly, the inclination of the axis line of the hinge cam 50, the inclination which may be caused by the rotation of the hinge cam 50 as the hinge cam 50 is biased by the biasing member 70 at the first shaft portion 51, is restricted. Thus, interference between the flange portion 53, and for example the pawls 30 and the cam 40 is restricted, which realizes smooth operations related to locking and unlocking (specifically, the locking operation).

(2) According to the aforementioned embodiment, the play P1 and the play P2 which are centered with respect to the axial direction are provided between each cam 40 and the corresponding hinge cam 50, and between each hinge cam 50 and the corresponding hinge pin 60 respectively in the circumferential direction and in the radial direction of the hinge cam 50. Thus, even in a case where the variation of the rotation angle is generated by the assembly error between the hinge cams 50, 50 each of which is positioned at each side in the seat width direction or between the hinge pins 60, 60 each of which is positioned at each side in the seat width direction, the variation is absorbed in the range of the play P1 and the play P2, and thus the variation of the rotation angle between the cams 40, 40 each of which is positioned at each side in the seat width direction is restricted. Accordingly, even when the external teeth 32 and the internal teeth 22 are meshed with each other insufficiently at one of the recliners 1, it is restricted that the locked state becomes unstable.

(3) According to the embodiment, the hinge pins 60 and the connecting member 80 are fixedly attached to each other in a state where each first end surface 63a and corresponding second end surface 80a are pressed against each other in the axial direction. Thus, the connecting member 80 is fixed to the hinge pins 60 in a manner that the connecting member 80 is sandwiched and held between the hinge pins 60 in the axial direction. Consequently, the coaxiality of the hinge pins 60 and the connecting member 80 as a whole may be easily improved.

Changes and modifications may be made to the embodiment. In the aforementioned embodiment, one of the play P1 between each hinge cam 50 and the corresponding hinge pin 60, and the play P2 between each cam 40 and the corresponding hinge cam 50 may be eliminated.

Fitting configurations of, for example, the cam 40 and the hinge cam 50 of the aforementioned embodiment are examples. Fitting may be established by a configuration including, for example, a shape of a letter D, a polygon shape or a serration. In the aforementioned embodiment, the engaging portion 37 may be provided at at least one pawl 30. The upper arm 20 may include one or two protruding portions 24. Alternatively, the upper arm 20 may include four or more protruding portions 24.

In the aforementioned embodiment, the number of the pawls arranged in the lower arm 10 may be arbitrarily determined. In a case where plural pawls are arranged, provided that the pawls move in accordance with each other or with one another, the pawls may include different shapes from each other or one another, or an identical shape.

In the aforementioned embodiment, the lower arm 10 may be fixed to the seatback and the upper arm 20 may be fixed to the seat cushion.

According to the aforementioned embodiment, the seat reclining apparatus for the vehicle includes the lower arm 10 configured to be fixedly attached to one of the seat cushion and the seatback and including the guide wall 13, the upper arm 20 configured to be fixedly attached to the other one of the seat cushion and the seatback, including the internal teeth 22 and being rotatably supported by the lower arm 10, the pawl 30 arranged in the accommodating space S formed between the lower arm 10 and the upper arm 20, including the external teeth 32 which are engageable with and disengageable from the internal teeth 22 and being arranged in a manner that the movement of the pawl 30 in the radial direction of the lower arm 10 is guided by the guide wall 13, the cam 40 rotatably arranged in the accommodating space S at the radially inner side relative to the pawl 30, engaging with the pawl 30, causing the pawl 30 to advance and retract along the guide wall 13, and causing the internal teeth 22 and the external teeth 32 to mesh with and unmesh from each other as the cam 40 rotates, the recessed portion 23 provided at the upper arm 20 concentrically with the internal teeth 22 in a manner that the recessed portion 23 is recessed in the axial direction of the upper arm 20 and including the protruding portion 24 provided in the range of the predetermined angle and protruding inwardly in the radial direction of the upper arm 20, the engaging portion 37 formed at the pawl 30 in a manner that the engaging portion 37 faces the recessed portion 23 in the radial direction of the pawl 30 at the position different, in the axial direction, from the engagement position at which the pawl 30 and the cam 40 engage with each other, and restricting the external teeth 32 and the internal teeth 22 from meshing with each other by being in contact with the protruding portion 24, the hinge cam 50 integrally rotatably fitted in the cam 40 by insertion in the axial direction and including the first shaft portion 51, the second shaft portion 52 and the flange portion 53, the first shaft portion 51 penetrates through the lower arm 10 and is rotatably supported at the lower arm 10, the second shaft portion 52 penetrates through the upper arm 20 and is journaled at the upper arm 20, the flange portion 53 is accommodated in the space S1 defined by the recessed portion 23 at the radially inner side relative to the engaging portion 37, and the biasing member 70 biasing and rotating the hinge cam 50 at the first shaft portion 51 in the one direction and causing via the cam 40 the pawl 30 to move in the radial direction in which the external teeth 32 and the internal teeth 22 mesh with each other or in which the engaging portion 37 and the protruding portion 24 are in contact with each other.

According to the above described structure, when the hinge cam 50 is biased by the biasing member 70 to rotate in the one direction, and thus when the pawl 30 is moved via the cam 40 in the radial direction in which the external teeth 32 and the internal teeth 22 mesh with each other, the relative rotation between the lower arm 10 and the upper arm 20 is restricted. Thus, the rotation of the seatback relative to the seat cushion is restricted (locked). In addition, by inputting the releasing operation force to the hinge cam 50, in a case where the hinge cam 50 is rotated in the opposite direction, that is, the direction opposite to the biasing direction of the biasing member 70, against the biasing force of the biasing member 70, and thus the pawl 30 is caused via the cam 40 to move in the radial direction in which the external teeth 32 and the internal teeth 22 unmesh, that is, disengage from each other, the relative rotation between the lower arm 10 and the upper arm 20 is allowed. Thus, the rotation of the seatback relative to the seat cushion is allowed (unlocked). On the other hand, in a case where the hinge cam 50 is biased by the biasing member 70 to rotate in the one direction and the pawl 30 is caused via the cam 40 to move in the radial direction, when the engaging portion 37 and the protruding portion 24 are in contact with each other, the external teeth 32 and the internal teeth 22 do not mesh with each other. Accordingly, the rotation of the seatback relative to the seat cushion is always allowed (unlocked) when the seatback is in a predetermined rotation range.

Because the flange portion 53 of the hinge cam 50 is accommodated in the space S1 defined by the recessed portion 23 at the radially inner side relative to the engaging portion 37, the pawls 30 and the cam 40 are restricted in the axial direction. Thus, the postures of the pawls 30 and the cam 40 are stably retained in the axial direction. In addition, because the hinge cam 50 is supported by the lower arm 10 at the first shaft portion 51 and is supported by the upper arm 20 at the second shaft portion 52, that is, the hinge cam 50 is supported at both ends thereof, the inclination of the axis line of the hinge cam 50, the inclination which may be caused by the rotation of the hinge cam 50 when the hinge cam 50 is biased by the biasing member 70 at the first shaft portion 51, is restricted. Thus, the interference between the flange portion 53, and, for example, the pawls 30 and the cam 40 is restricted, which realizes the smooth operations related to locking and unlocking (specifically, the locking operation).

According to the aforementioned embodiment, the pawls 30 and the cam 40 are restricted in the axial direction, and the operations related to locking and unlocking are performed smoothly.

According to the aforementioned embodiment, the lower arm 10, the upper arm 20, the pawl 30, the cam 40, the hinge cam 50 and the biasing member 70 are arranged at each side in the seat width direction in a manner that the lower arm 10, the upper arm 20, the pawl 30, the cam 40, the hinge cam 50 and the biasing member 70 are provided as pairs. The seat reclining apparatus for the vehicle further includes the hinge pin 60 fitted in each hinge cam 50 by insertion in the axial direction and rotating integrally with the corresponding hinge cam 50, the operation member 75 integrally rotatably connected to one of the hinge pins 60 and inputting the releasing operation force to the hinge pin 60, the connecting member 80 integrally rotatably connected to the hinge pin 60 arranged at each side in the seat width direction and transmitting the rotation of one of the hinge pins 60 to the other one of the hinge pins 60 as the releasing operation force is inputted, and the play P1, P2 provided at at least one of between each cam 40 and each hinge cam 50 and between each hinge cam 50 and each hinge pin 60, and being provided in the circumferential direction and in the radial direction of the hinge cam 50 while being centered with respect to the axial direction.

According to the above described structure, even in a case where the variation of the rotation angle is generated by the assembly error between the hinge cams 50, 50 each of which is positioned at each side in the seat width direction or between the hinge pins 60, 60 each of which is positioned at each side in the seat width direction, the variation is absorbed in the range of the play P1 and the play P2, and thus the variation of the rotation angle between the cams 40, 40 is restricted. Accordingly, even when the external teeth 32 and the internal teeth 22 mesh with each other insufficiently at one of the recliners 1, it is restricted that the locked state becomes unstable.

According to the aforementioned embodiment, each hinge pin 60 includes the first end surface 63a facing the connecting member 80 in the axial direction and extending in the plane that is perpendicular to the axial direction, the connecting member 80 includes the second end surfaces 80a each facing the corresponding hinge pin 60 in the axial direction and each extending in the plane that is perpendicular to the axial direction, and the hinge pins 60 and the connecting member 80 are fixedly attached to each other in a state where each first end surface 63a and the corresponding second end surface 80a are pressed against each other in the axial direction.

According to the above described structure, the hinge pins 60 and the connecting member 80 are fixedly attached to each other in a state where each first end surface 63a and the corresponding second end surface 80a are pressed against each other in the axial direction. Thus, the connecting member 80 is fixed to the hinge pins 60 in a manner that the connecting member 80 is sandwiched and held between the hinge pins 60 in the axial direction. Consequently, the coaxiality of the hinge pins 60 and the connecting member 80 as a whole is easily improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle, comprising:
   a first arm configured to be fixedly attached to one of a seat cushion and a seatback, the first arm including a guide wall;
   a second arm configured to be fixedly attached to the other one of the seat cushion and the seatback, the second arm including internal teeth and being rotatably supported by the first arm;
   a pawl arranged in an accommodating space formed between the first arm and the second arm, the pawl including external teeth which are engageable with and disengageable from the internal teeth, the pawl being arranged in a manner that movement of the pawl in a radial direction of the first arm is guided by the guide wall;
   a cam rotatably arranged in the accommodating space at a radially inner side relative to the pawl, the cam engaging with the pawl, causing the pawl to advance and retract along the guide wall, and causing the internal teeth and the external teeth to mesh with and unmesh from each other as the cam rotates;
   a recessed portion provided at the second arm concentrically with the internal teeth in a manner that the recessed portion is recessed in a direction of an axis line of the second arm, the recessed portion including a restricting portion provided in a range of a predetermined angle and protruding inwardly in a radial direction of the second arm;
   an engaging portion formed at the pawl in a manner that the engaging portion faces the recessed portion in a radial direction of the pawl at a position different, in the direction of the axis line, from an engagement position at which the pawl and the cam engage with each other, the engaging portion restricting the external teeth and the internal teeth from meshing with each other by being in contact with the restricting portion;
   a hinge cam integrally rotatably fitted in the cam by insertion in the direction of the axis line, and including a first shaft portion, a second shaft portion and a flange portion, the first shaft portion penetrating through the first arm and rotatably supported at the first arm, the second shaft portion penetrating through the second arm and journaled at the second arm, the flange portion being accommodated in a space defined by the recessed portion at a radially inner side relative to the engaging portion;
   a biasing member biasing and rotating the hinge cam at the first shaft portion in one direction and causing via the cam the pawl to move in a radial direction in which the external teeth and the internal teeth mesh with each other or in which the engaging portion and the restricting portion are in contact with each other, wherein the first arm, the second arm, the pawl, the cam, the hinge cam and the biasing member are arranged at each side in a seat width direction in a manner that the first arm, the second arm, the pawl, the cam, the hinge cam and the biasing member are provided as pairs;
   a hinge pin fitted in each hinge cam by insertion in the direction of the axis line and rotating integrally with the corresponding hinge cam;
   an operation member integrally rotatably connected to one of the hinge pins and inputting a releasing operation force to the hinge pin;
   a connecting member integrally rotatably connected to the hinge pin arranged at each side in the seat width direction and transmitting a rotation of one of the hinge pins to the other one of the hinge pins as the releasing operation force is inputted; and
   a play provided at at least one of between each cam and each hinge cam and between each hinge cam and each hinge pin, the play being provided in a circumferential direction and in a radial direction of the hinge cam while being centered with respect to the direction of the axis line.

2. The seat reclining apparatus for the vehicle according to claim 1, wherein
   each hinge pin includes a first end surface facing the connecting member in the direction of the axis line and extending in a plane that is perpendicular to the direction of the axis line;
   the connecting member includes second end surfaces each facing the corresponding hinge pin in the direction of the axis line and each extending in a plane that is perpendicular to the direction of the axis line; and
   the hinge pins and the connecting member are fixedly attached to each other in a state where each first end surface and the corresponding second end surface are pressed against each other in the direction of the axis line.

* * * * *